United States Patent
Rosenstrom

(10) Patent No.: US 6,267,361 B1
(45) Date of Patent: Jul. 31, 2001

(54) DYNAMIC REACTION REDUCER FOR ISOLATED VIBRATORY EQUIPMENT

(75) Inventor: Bo Richard Rosenstrom, Louisville, KY (US)

(73) Assignee: Carrier Vibrating Equipment, Inc., Louisville, KY (US)

( * ) Notice: Subject to any disclaimer, the term of this patent is extended or adjusted under 35 U.S.C. 154(b) by 0 days.

(21) Appl. No.: 09/666,827

(22) Filed: Sep. 21, 2000

(51) Int. Cl.[7] .................................................... F16F 13/00
(52) U.S. Cl. .......................................... 267/140.11; 267/33
(58) Field of Search .................................. 188/378–380; 248/550, 636, 638; 267/33, 136, 140.11, 140.13

(56) References Cited

U.S. PATENT DOCUMENTS

| | | |
|---|---|---|
| 2,830,696 | 4/1958 | Musschoot . |
| 3,447,671 | 6/1969 | Schweinfurth . |
| 3,552,545 | 1/1971 | Hartman . |
| 3,668,939 | 6/1972 | Schrader . |
| 3,746,149 | 7/1973 | Schrader . |
| 4,040,590 | 8/1977 | Baratoff . |
| 4,150,588 | 4/1979 | Brewer . |
| 4,162,778 | 7/1979 | Kraft . |
| 4,365,770 | 12/1982 | Mard et al. . |
| 4,550,812 | 11/1985 | Mard . |
| 4,736,701 | 4/1988 | Kondo et al. . |
| 5,040,666 | 8/1991 | Patel . |
| 5,544,725 | * 8/1996 | Hanke et al. .................. 267/221 |
| 5,564,537 | * 10/1996 | Shoureshi ..................... 188/380 |
| 5,637,938 | 6/1997 | Vukorpa et al. . |
| 5,669,594 | 9/1997 | Platus et al. . |
| 5,687,948 | 11/1997 | Whiteford et al. . |
| 5,713,457 | 2/1998 | Musschoot . |
| 5,868,241 | 2/1999 | Pellegrino . |
| 5,906,254 | * 5/1999 | Schmidt et al. ............... 267/136 |
| 5,947,453 | 9/1999 | Eastman et al. . |
| 5,988,610 | * 11/1999 | Hiraki et al. ................ 267/140.13 |
| 6,079,698 | * 6/2000 | Patterson et al. .............. 267/33 |

* cited by examiner

Primary Examiner—Christopher P. Schwartz
(74) Attorney, Agent, or Firm—Vance A. Smith; Stites & Harbison

(57) ABSTRACT

A dynamic reaction reducer operably connected between spring isolated vibrating equipment and stationary support structure where the reducer permits the equipment to be operated within a range of operating frequencies with inducing excessive vibration to the support structure.

11 Claims, 4 Drawing Sheets

DYNAMIC REACTION REDUCER FOR ISOLATED VIBRATORY EQUIPMENT

BACKGROUND

All pieces of vibratory equipment, such as conveyors and feeders, have associated "static" and "dynamic reaction" forces at the structural support points. The "static reaction" forces are simply the forces of the weight of the equipment on the supporting structure. These static forces do not vary significantly over time. The "dynamic reaction" forces are those forces on the supporting structure that are produced when the equipment is operating. The dynamic forces vary in time, are dependent on the operating frequency of the equipment (which is determined by the stiffness of the springs used in the mounting of the equipment and the amplitude of the movement of the equipment), are fully reversing (tension/compression forces), and typically occur at a relatively high frequency of about 5–30 Hz.

For many end-users of vibratory equipment, one of the primary concerns when designing a new manufacturing plant, and associated buildings, are the dynamic reaction forces produced by the vibratory equipment. The supporting structures have to handle both the magnitude as well as the frequency of the dynamic forces. Because buildings have their own natural frequencies, the impact of the operating frequency of the equipment, in particular, must be taken into consideration. If one of the natural frequency modes of vibration of the building is in close proximity to the operating speed of the equipment, there can be some significant "dynamic amplification." This can cause the vibration levels to become quite high, thereby creating safety hazard and discomfort for persons working within the building.

It is known in the art that dynamic vibration absorbers can be used to essentially remove one component of the dynamic force to alter the net direction of the force on the equipment. For example, in U.S. Pat. No. 3,834,523, issued to Evans, a resiliently supported vibratory conveyor is guided along an inclined path of vibration by dynamic vibration absorbers the springs of which are firmly attached to the conveyor structure. The absorbers serve as the equivalent of rigid links from a fixed support to confine the vibratory motion of the conveyor to the desired inclined path without transmitting substantial vibratory force to the support structure. However, systems of this type do not attempt to reduce the dynamic reaction forces to essentially zero. They simply alter the direction of the forces, and hence, the detrimental effect of the forces must still be addressed with regard to the building structure.

An early excellent attempt at addressing the problems of dynamic forces acting upon the support structure for a vibrating apparatus is found in U.S. Pat. No. 3,668,939, issued to Schrader. This patent describes a two-degree of freedom dynamic absorber used to generate—at the operating frequency—a counterforce that opposing the vibration producing forces applied to a conveyor base in both the vertical and horizontal directions, regardless of the phasing or timing between the forces. The absorbers include an upstanding flange mounted on a bracket attached to the base of the conveyor. Extending from either side of the flange is a pair of springs, with a weight mounted at the end of each spring. The weights and springs, in combination, form a vibratory system constituting a dynamic absorber the natural frequency of which in any direction parallel to the flange is closely equal to the frequency of the vibratory forces applied to the bracket, and hence the conveyor, which forces are to be counterbalanced. While the objective of the absorbers of the '939 patent to effectively counterbalance the vibratory forces applied to the base which vary in both amplitude and direction according to the load on the conveyor was addressed, the absorbers are somewhat limited with respect to the frequency range over which they can be used. When the spring and weight absorbers are constructed to operate at low frequencies, they tend to occupy considerable space, making them impractical. The smaller, more space saving absorbers function well at low frequencies, but are very sensitive to changes in the operating speed of the system, and can cause severe structural damage if operated outside the narrow operating band.

Thus, a paramount objective is to devise a broad band absorber that is not extremely sensitive to changes in the operating speed of the system, requires relatively little space for installation, and is relatively inexpensive to install.

SUMMARY OF THE INVENTION

The dynamic absorber in accordance with the present invention includes a modulating spring along with an absorber spring and an absorber mass. Isolation springs are mounted between the modulating spring and the vibrating machinery. When the vibrating machinery is operated, motion is transmitted to the absorber mass attached to the absorber spring. If the tuning ratio of the absorber is such that its natural frequency has essentially the same magnitude as the operating speed of the machinery, i.e., "coincides" with the operating frequency, the absorber, when excited, will vibrate essentially 180° out of phase with the primary forcing function. Thus, the forces essentially cancel each other and the overall effect is a reduction in the forces transferred to the structure supporting the vibrating machinery.

DETAILED DESCRIPTION OF FIGURES

DETAILED DESCRIPTION OF THE PREFERRED EMBODIMENT

The specific dynamic absorber system depicted in the various Figures is selected solely for the purposes of illustrating the invention. Additionally, the selection of a vibratory fluid bed for use with the dynamic absorber system of the present invention is strictly done as an example of the type of equipment usable with the system. Other and different types of equipment which produce net vibrational forces when operating may utilize the inventive features of the dynamic absorber system described herein as well.

Figure 1:
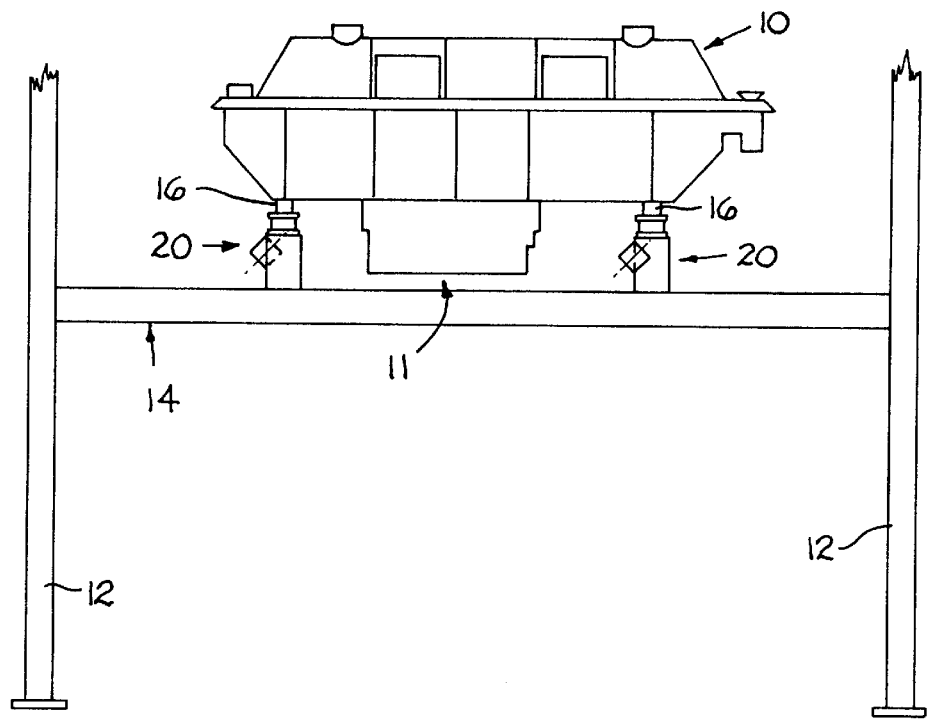
FIG. 1 is a perspective view of a vibratory fluidbed that includes the dynamic absorber made in accordance with the present invention.

Reference is first made to FIG. 1 in which a conventional vibratory fluidbed 10 driven by a vibratory system 11 is coupled by an isolating spring 16 to a dynamic absorber system of the present invention shown generally by the reference numeral 20. The vibratory system 11 is a typical vibratory force inducing mechanism such as a plurality of rotating eccentric weights arranged to drive the fluidbed at a predetermined angle of attack and operating frequency. Because the vibratory system 11 is not essential for an understanding of the invention, it is shown only in block form.

Figure 2:
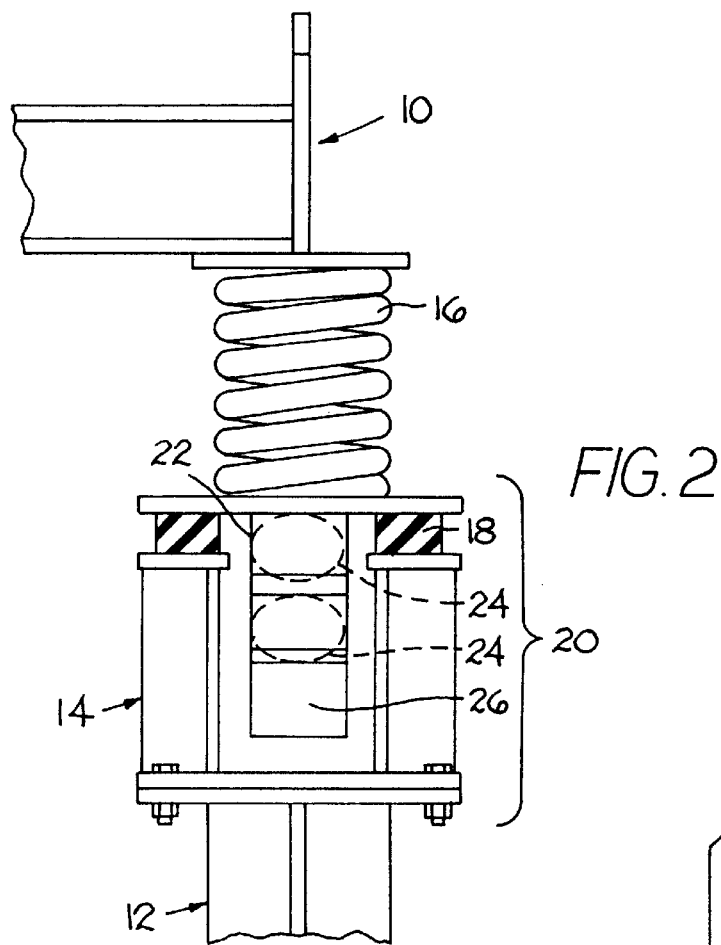
FIG. 2 is a front view of the dynamic reaction reducer of FIG. 1.
Figure 3:
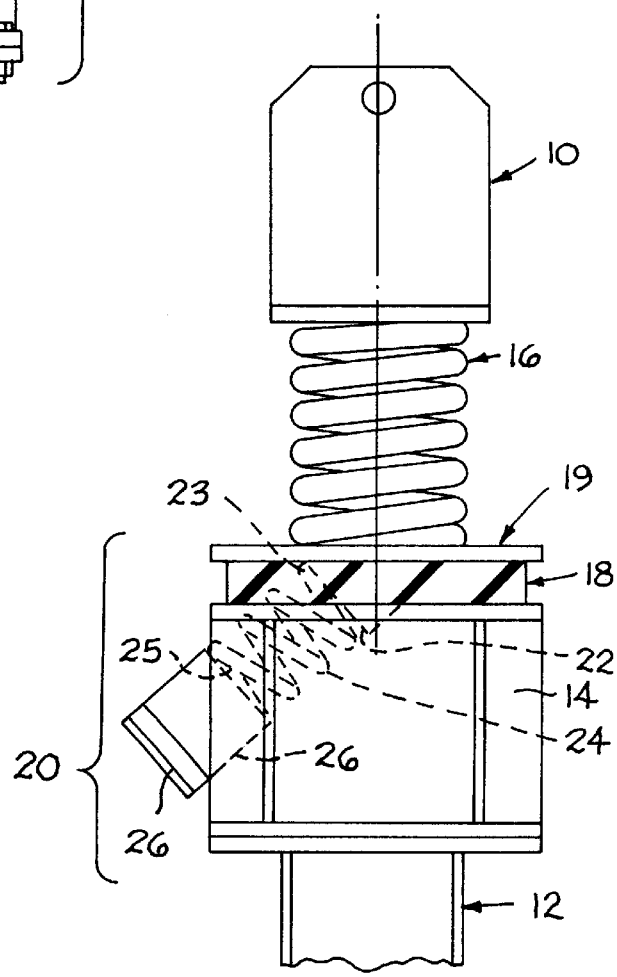
FIG. 3 is a side view of the dynamic reaction reducer of FIG. 1.

As perhaps best seen in the views of FIGS. 2 and 3, the dynamic absorber system 20 is illustrated as being mounted to one side, i.e., the underneath surface, of a separator plate 19 that also serves as a mounting for one end of an isolation spring 16 connected at the other end to the fluidbed 10. The dynamic absorber system 20 includes a number of elements such as a modulating spring 18, an absorber spring attachment 22, and absorber spring 24, and an absorber mass 26. The modulating spring 18 is attached at one end thereof to the under surface of plate 19 and at the other end to the support frame 14. Thus, the plate 19 functions to separate the isolation spring 16 from the modulating spring 18 and from the frame 14.

The characteristics of the modulating spring 18 will depend on the particular application. For example, the spring 18 may be a rubber spring, a steel coil, a leaf spring, a fiberglass spring, or other types of springs known in the art. A softer spring 18 may be selected for application across a broader band of operating frequencies, but must be matched to the other components of the dynamic absorber system and based on the user's needs. In this embodiment, however, the spring 18 is a rubber spring having an annular shape that allows the L-shaped absorber attachment to be mounted to the under surface of plate 19 within the area circumscribed by spring 18 directly beneath the isolation spring 16.

The absorber spring 24, preferably a downwardly projecting coil spring having a pair of ends 23, 25, is secured to the absorber attachment 22 at end 23. The other end 25 of absorber spring 24 is attached to an absorber mass 26. It is important that the absorber system 20 should be structured so as to have a natural frequency that coincides with the frequency of the equipment. Thus, the specific mounting orientation will differ with different pieces of equipment, with different isolation springs, and as the angle of attack varies for the particular piece of equipment. For example, in the embodiment shown in FIGS. 1–3, the absorber attachment 22 being an essentially an L-shaped unit that, when secured to the support frame 14, causes the axis of the absorber spring 24 to lay in a plane essentially perpendicular to the axial length of the vibratory fluidbed 10 and to project away from the axis of the modulating spring 18 at about a 45° angle. As shown in FIGS. 1–3, the plane is essentially vertical as the axial length of the bed is oriented essentially horizontal. It should be understood, however, while important to have the proper orientation of the absorber spring 24 and mass 26 relative to the support structure 12 and support frame 14, the precise value of the angle is not critical to the invention and will vary in accordance with changes in the various parameters of the other components of the vibrating equipment and dynamic absorber.

A major distinguishing feature between the dynamic absorber 20 of the present invention and those in the prior art is the inclusion of the modulating spring 18. This inclusion along with the orientation of the absorber spring 24 relative to the support structure 12 and the support frame 14. These features affect the impact of the dissipation of the forcing function, $F_O$, generated by the vibratory fluidbed 10 on the support structure 12.

To demonstrate clearly the beneficial results of the present invention is most easily described through some comparative examples. The first example below should be read referencing FIGS. 5 and 6 and uses vibrating equipment in which the dynamic absorber is simply the various isolating springs. The second example read in reference to FIGS. 7 and 8 uses a dynamic absorber typical of those in the prior art while the third example (FIGS. 1, 2, and 3) uses the dynamic absorber in accordance with the present invention. The equations used may be found in any text on vibrations and equipment. The values for the various variables and values for them are tabulated in each example are also set forth in Table 1 for convenient retrieval.

EXAMPLE 1

Figure 5:
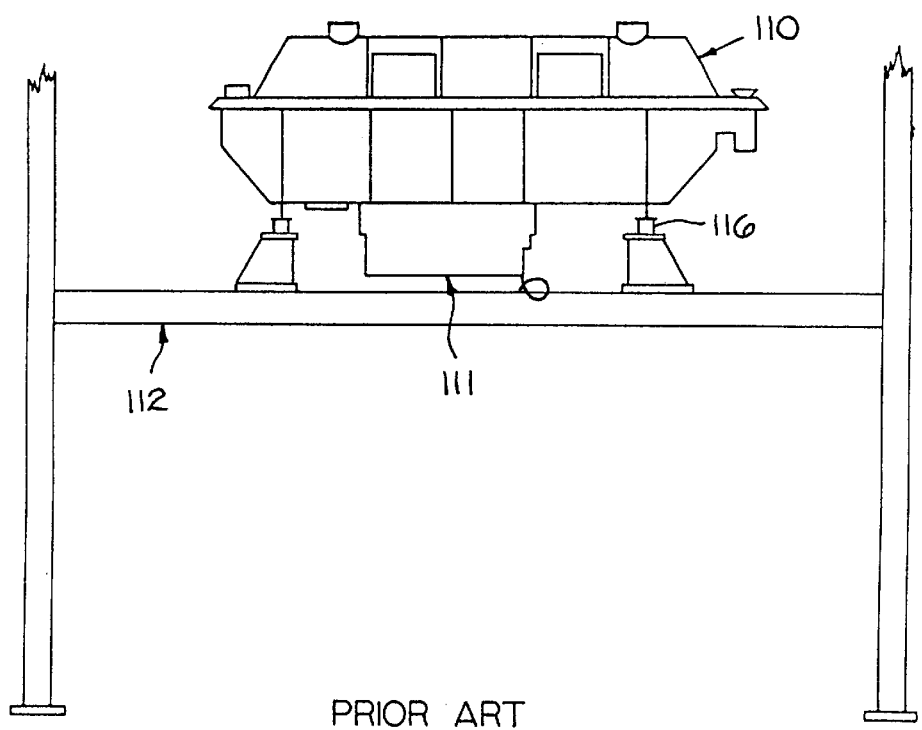
FIG. 5 is a perspective view of a vibratory fluidbed mounted on isolation springs as found in conventional mountings of the prior art.
Figure 6:
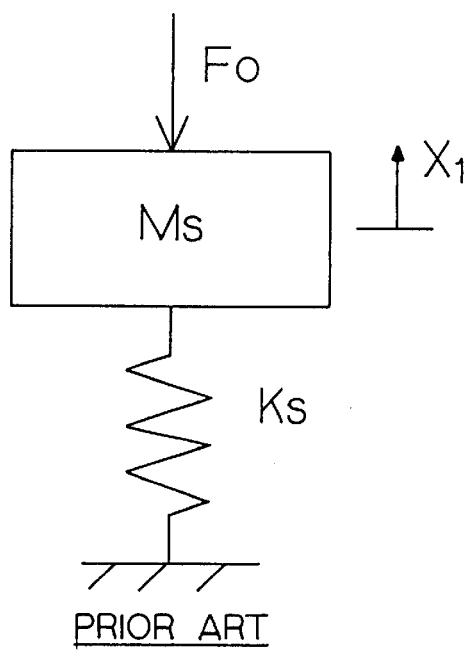
FIG. 6 is a kinetic model the dynamic system of FIG. 5 including mass and stiffness of the supporting structure as well as the dynamic reaction produced by the fluid bed during normal operation.

Example 1 uses a relatively simple system—a vibratory fluidbed 110 supported on a support structure 112 and separated from the structure 112 by isolations springs 116—is shown in FIG. 5. A kinetic model for the system of FIG. 5 is shown in FIG. 6, wherein the structure is reduced to a single degree of freedom system. For comparison to other systems, it will be assumed that the stroke of the vibrating machine is held to essentially 0.25 inches and the operating speed is held at essentially 800 rpm (which is an angular operating speed, $\omega$, of 83.78 rad sec$^{-1}$).

$$NF_S = (1/2\pi)^*(K_S/M_S)^{1/2} \tag{1}$$

where $NF_S$ is the natural frequency of the structure, $M_S$ is the mass of the support structure, and $K_S$ is the stiffness of the support structure.

Using a value of 10,000 lb for $M_S$, and 300,000 lbf in$^{-1}$ for $K_S$, then $NF_S$, is found to be 1027.72.

The magnitude of the forcing function $F_O$ then may be calculated from the known expression $$F_O = K_I^*(\text{stroke}/2)) \tag{2}$$

where $K_I$ is the isolation spring stiffness. Assuming a value of 3,500 lbf in$^{-1}$ then the magnitude of the forcing function, $F_O$, is 437.5 lbf. This force varies sinusoidally with time. The maximum amplitude of the support structure motion, A, can then be estimated, assuming that a harmonic solution can be applied to the system, by using the equation $$A = F_O/(K_S - M_S\omega^2) \tag{3}$$

For the system shown in FIG. 5, A equals 0.003701 inches. This value can then be used to calculate the peak acceleration for the structure, Acc, since $$Acc = A^*\omega^2, \text{ or } 25.97 \text{ inches sec}^{-2} \tag{4}$$

for the structure shown in FIG. 5. This peak acceleration for the structure can then be compared to the maximum allowable structure acceleration data, such as published by the International Standards Organization in publication ISO 2631-2, 1989. Finally, the maximum amplitude, A, can be used to calculate the corresponding maximum dynamic reaction at the base, TDR, from the expression TDR=$K_S$*A. Using the value of TDR, the dynamic transmissibility percentage, TMP, can be calculated from equation (5) below. The dynamic transmissibility percentage is the absolute value of the ratio of the maximum dynamic reaction at the base to the magnitude of the forcing function.

$$TMP = |TDR/F_O|*100). \tag{5}$$

It is important to note that for the system shown in FIG. 5, the TMP is about 254%. Any value greater than 100% indicates that there is dynamic amplification when the vibratory equipment is operating. The vibration caused by machinery having this value would be readily noticeable by a worker.

In this particular example, one option to reduce the vibrational to acceptable levels would be to add additional stiffness to the structure. However, it can easily be shown in the present example that it would take a 100% increase in structure stiffness to obtain this goal. This would be an extremely expensive option in most circumstances and not commercially viable. In most cases, changes in structural mass would also not be viable option.

Another option would be to change the operating speed of the equipment itself. Such changes present further problems as an increase in speed would bring the speed near resonance of the structure. A decrease in speed while bringing about diminished vibrations typically would cause process capacity to suffer. Again this does not represent a viable alternative.

Finally, consideration may be given to change the stiffness of the isolation springs. However, it can easily be shown that such change would lead to custom built springs, a number of which would be considered unstable. Thus, it is apparent from the above that some type of dynamic absorber is required.

EXAMPLE 2

Figure 7:
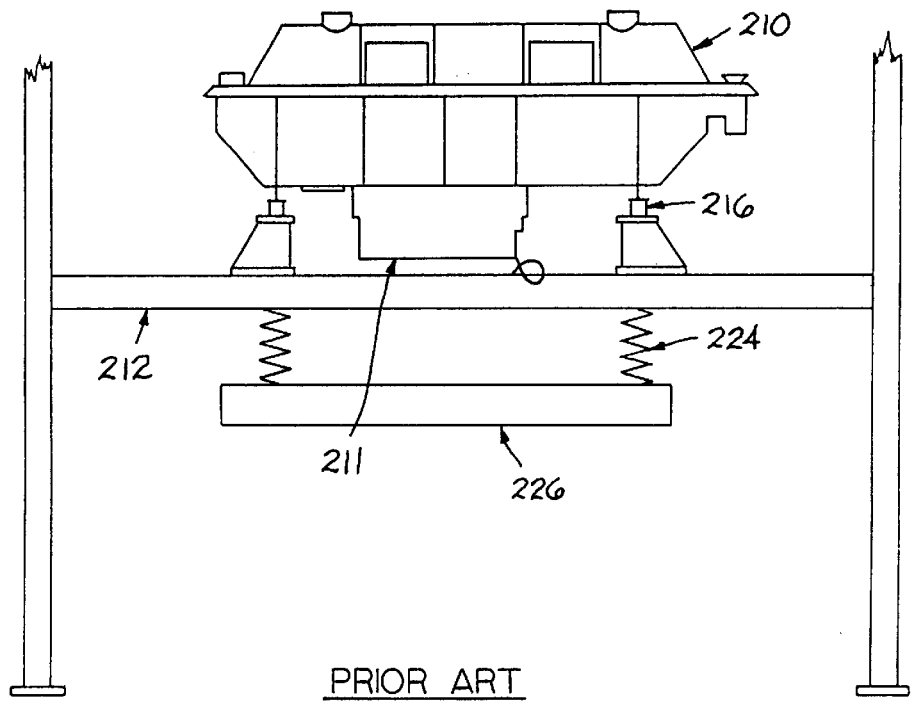
FIG. 7 is a perspective view of a vibratory fluidbed that includes a dynamic absorber as is known from the prior art.
Figure 8:
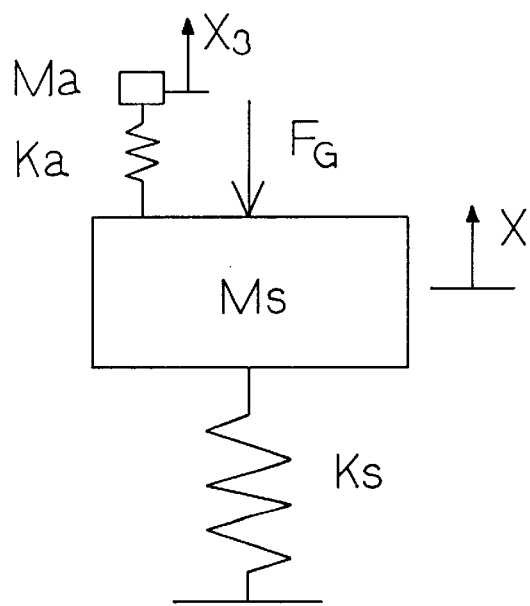
FIG. 8 is a kinetic model depicting the force produced by the vibratory fluidbed when in operation and the various springs and masses associated with the prior art dynamic absorber of FIG. 7.

Example 2 involves a system which includes a relatively simple dynamic absorber known in the prior art is shown in FIG. 7. As depicted therein, a vibratory fluidbed 210 is supported on a support structure 212 and separated from the structure 212 by isolations springs 216. A dynamic absorber, including absorber springs 224 and an absorber mass 226, is mounted on the support structure 212 below the vibratory fluidbed 210. A kinetic model for the system of FIG. 7 is shown in FIG. 8, wherein the system is reduced to two-degrees of freedom. Assuming that the stroke of the vibrating machine is held to essentially 0.25 inches an operating speed of essentially 800 rpm or an angular operating speed of 83.78 sec$^{-1}$, the mass of the support structure ($M_S$) of 10,000 lb, the stiffness of the support structure ($K_S$) at about 300,000 lbf in$^{-1}$, and the isolation spring stiffness ($K_I$) of 3,500 lbf in, the resonance frequency of the structure ($NF_S$) from equation (1) above is 1027.72 rpm, and the magnitude of the forcing function ($F_O$) form (2) above is 437.5 lbf, which varies sinusoidally with time. However, because the system also has a dynamic absorber, the effects of the absorber springs and mass must be considered. Assuming that the spring stiffness of absorber ($K_A$) is 1818 lbf in$^{-1}$, and the mass of the absorber ($M_A$) is 100 lb, then the resonance frequency of the absorber, $NF_A$, is 800.04 rpm (as calculated by using the equation $$NF_A = (1/2\pi)*(K_A/M_A)^{1/2}). \tag{6}$$

The impact of the absorber must also be considered when calculating the maximum amplitude of the support structure motion, A (where y=A sin($\omega$t)). In this situation, the maximum amplitude can be estimated by assuming that a harmonic solution can be to a system with two-degrees of freedom, so the equation for A is:

$$A = \frac{(K_S - M_S\omega^2)}{K_A} \times \frac{F_O}{(K_S + K_A)\left(\frac{K_S - M_S\omega^2}{K_A} - \frac{K_A}{K_S + K_A}\right)} \tag{7}$$

Further, the maximum amplitude of the absorber motion, B, can be calculated using the equation:

$$B = \frac{F_O}{(K_S + K_A)\left(\frac{K_S - M_S\omega^2}{K_A} - \frac{K_A}{K_S + K_A}\right)} \tag{8}$$

For the system shown in FIG. 7, A equals—0.000025 inches and B equals—0.24 inches. The negative value for B indicates that the absorber is 180° out of phase with the driving force, thereby canceling the vibration. As with the previous example, the structure maximum amplitude A can then be used to calculate the peak acceleration for the structure (Acc) shown in FIG. 7, the corresponding maximum dynamic reaction at the base (TDR), and the dynamic transmissibility percentage, TMP. In the present example, the peak acceleration (Acc) is 0.17 inches sec$^{-2}$ for the structure, the TDR is—7.38 lbf, and the TMP is 1.69%.

From the above it can be seen that the TMP is an excellent value and certainly represents a very efficient, low cost solution to the vibration problems created by the vibratory fluidbed 210 at that frequency. Unfortunately, such a system is extremely speed sensitive. For example, if the operating speed of the vibratory equipment is changed by as little as 3 rpm, e.g., from 800 rpm to 797 rpm (changing the angular operating speed, $\omega$, to 83.46 rad sec$^{-1}$), the corresponding maximum dynamic reaction at the base (TDR) equals 2111 lbf, and the dynamic transmissibility percentage (TMP) equals 482%. Such a value for TMP is clearly unacceptable as it sets up conditions which can result in structural damage to the manufacturing facilities. The system as illustrated in FIG. 7, therefore, has very limited application and cannot be used over a range of equipment operating speeds.

EXAMPLE 3

Figure 4:
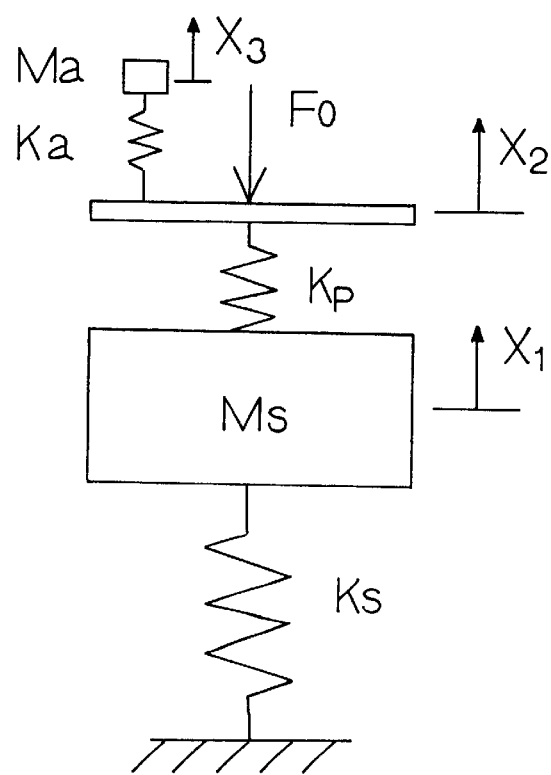
FIG. 4 is a kinetic model depicting the force produced by the vibratory fluidbed when in operation and the various springs and masses associated with the dynamic absorber of FIG. 1 which can dissipate the force.

The dynamic absorber 20 of the present invention, however, is effective over a much broader operational range. Referring again to FIGS. 2 and 3, the dynamic absorber 20 relies on the modulating spring 18 in addition to the isolation spring 16, absorber spring 24, and absorber mass 26, to dissipate the vibratory forces from the vibratory fluidbed 10. A kinetic model for the system of FIGS. 1–3 is shown in FIG. 4, wherein the structure is reduced to a three-degree of freedom system. The same type of calculations as shown above while assuming the following values:

(a) stroke of the vibrating machine to be essentially 0.25 inches, the operating speed to be held at essentially 800 rpm, (b) the mass of the support structure ($M_S$) to be 10,000 lb, (c) the stiffness of the support structure ($K_S$) to be 300,000 lbf in$^{-1}$, (d) the isolation spring stiffness ($K_I$) to be 3,500 lbf in$^{-1}$, (e) the spring stiffness of absorber ($K_A$) to be 1819 lbf in$^{-1}$, (f) the mass of the absorber ($M_A$) is 102 lb; and (g) the angular operating speed ($\omega$) to be 83.78 rad sec$^{-1}$. The resonance frequency of the structure ($NF_S$) may be shown to be 1027.72 rpm, the magnitude of the forcing function ($F_O$) to be 437.5 lbf, and the resonance frequency of the absorber, $NF_A$, is 792.38 rpm. In this case, the maximum amplitude of the support structure motion, A, and the maximum amplitude of the absorber motion, B, must consider the impact of the modulating spring 18 on the system. Assuming that the modulating spring 18 has a spring stiffness, $K_P$, of 8000 lbf in$^{-1}$, the maximum amplitude can be estimated by assuming that a harmonic solution can be to a system with three-degrees of freedom, so the equation for A is:

$$A = \left[\frac{K_P}{(K_P + K_S) - M_S \cdot \omega^2}\right].$$

$$\frac{F_0}{(K_A + K_P) - \frac{K_A^2}{K_A - M_A \cdot \omega^2} - \frac{K_P^2}{(K_P + K_S) - M_S \cdot \omega^2}}$$

The maximum amplitude of the absorber motion, B, can be calculated using the equation:

$$B = \left(\frac{K_A}{K_A - M_A \cdot \omega^2}\right) \cdot \frac{F_0}{(K_A + K_P) - \frac{K_A^2}{K_A - M_A \cdot \omega^2} - \frac{K_P^2}{(K_P + K_S) - M_S \cdot \omega^2}}$$

The base plate motion, C, must also be considered, and can be calculated using the equation:

$$C = \frac{F_0}{(K_A + K_P) - \frac{K_A^2}{K_A - M_A \cdot \omega^2} - \frac{K_P^2}{(K_P + K_S) - M_S \cdot \omega^2}}$$

For the system shown in FIGS. 1–3, A equals 0.000268 inches, B equals—0.22 inches, and C equals 0.004232 inches. Using the structure maximum amplitude A, the peak acceleration for the structure (Acc) shown in FIG. 1 is 1.88 inches sec$^{-2}$ for the structure, the corresponding maximum dynamic reaction at the base (TDR) is 80.47 lbf, and the dynamic transmissibility percentage (TMP) is 18.39%. Thus, the dynamic absorber 20 is effective for countering the vibration problems created by the vibratory fluidbed 10. Moreover, this system is applicable over a broad range of operating speeds. For example, if the operating speed of the vibratory equipment is changed from 800 rpm to 797 rpm (changing the angular operating speed, $\omega$, to 83.46 rad sec$^{-1}$), the corresponding maximum dynamic reaction at the base (TDR) equals 49.97 lbf, and the dynamic transmissibility percentage (TMP) equals 11.42%, which are well within the desirable range. Even when the operating speed of the vibratory equipment is changed to extremes such as 780 rpm ($\omega$=81.68 rad sec$^{-1}$) and 805 rpm ($\omega$=84.29 rad sec$^{-1}$), the dynamic transmissibility percentages are 35.98% and 29.37%, respectively.

Thus, from the calculations above it may be seen that the dynamic absorber 20 of the present invention is a broad band absorber and not extremely sensitive to changes in the operating speed of the system. Within the operating frequency range, the dynamic absorber 20 that includes the absorber spring and mass and modulating spring collectively provide a dynamic transmittability percentage that is acceptable, i.e., less than about 100%, throughout the operating frequency range. Moreover, if required by the user, the absorber of the present invention can cover a broader band than demonstrated in this particular example merely by increasing the absorber mass or by decreasing the stiffness of the modulating spring, or by a combination of changing the absorber and changing the stiffness of the modulating spring. Further, the dynamic absorber 20 requires relatively little space for installation, and that is relatively inexpensive to install.

It is understood that, in light of a reading of the foregoing description and drawings, those with ordinary skill in the art will be able to make changes and modifications to the present invention without departing from the spirit or scope of the invention, as defined herein.

TABLE I

| Variables/Calculated Value | Example 1 | Example 2 | Example 2 | Example 3 | Example 3 | Example 3 | Example 3 |
| --- | --- | --- | --- | --- | --- | --- | --- |
| Vib Machine Stroke | 0.25 in | 0.25 in | 0.25 in | 0.25 in | 0.25 in | 0.25 in | 0.25 in |
| Operating speed | 800 rpm | 800 rpm | 797 rpm | 800 rpm | 797 rpm | 780 rpm | 805 rpm |
| $\omega$ | 83.78 rad sec$^{-1}$ | 83.78 rad sec$^{-1}$ | 83.46 rad sec$^{-1}$ | 83.78 rad sec$^{-1}$ | 83.46 rad sec$^{-1}$ | 81.68 rad sec$^{-1}$ | 84.29 rad sec$^{-1}$ |
| $M_S$ | 10,000 lb | 10,000 lb | 10,000 lb | 10,000 lb | 10,000 lb | 10,000 lb | 10,000 lb |
| $K_S$ | 300,000 lbf in$^{-1}$ | 300,000 lbf in$^{-1}$ | 300,000 lbf in$^{-1}$ | 300,000 lbf in$^{-1}$ | 300,000 lbf in$^{-1}$ | 300,000 lbf in$^{-1}$ | 300,000 lbf in$^{-1}$ |
| $NF_S$ | 1027.72 rpm | 1027.72 rpm | 1027.72 rpm | 1027.72 rpm | 1027.72 rpm | 1027.72 rpm | 1027.72 rpm |
| $K_I$ | 3,500 lbf in$^{-1}$ | 3,500 lbf in$^{-1}$ | 3,500 lbf in$^{-1}$ | 3,500 lbf in$^{-1}$ | 3,500 lbf in$^{-1}$ | 3,500 lbf in$^{-1}$ | 3,500 lbf in$^{-1}$ |
| $F_O$ | 437.5 lbf | 437.5 lbf | 437.5 lbf | 437.5 lbf | 437.5 lbf | 437.5 lbf | 437.5 lbf |
| $M_A$ | n/a | 100 lb | 100 lb | 102 lb | 102 lb | 102 lb | 102 lb |
| $K_A$ | n/a | 1818 lbf in$^{-1}$ | 1818 lbf in$^{-1}$ | 1819 lbf in$^{-1}$ | 1819 lbf in$^{-1}$ | 1819 lbf in$^{-1}$ | 1819 lbf in$^{1}$ |
| $NF_A$ | n/a | 800.04 rpm | 800.04 rpm | 792.38 rpm | 792.38 rpm | 792.38 rpm | 792.38 rpm |
| $K_P$ | n/a | n/a | n/a | 8000 lbf in$^{-1}$ | 8000 lbf in$^{-1}$ | 8000 lbf in$^{-1}$ | 8000 lbf in$^{-1}$ |
| A | 0.003701 in | 0.000025 in | 0.007039 in | 0.000268 in | 0.000268 in | 0.000525 in | 0.000428 in |
| B | n/a | 0.24 in | 0.93 in | 0.22 in | 0.22 in | 0.29 in | 0.21 in |
| C | n/a | n/a | n/a | 0.004232 in | 0.004232 in | 0.0088 in | 0.0066 in |
| TDR | 1110.23 lbf | 7.38 lbf | 2111 lbf | 80.47 lbf | 49.97 lbf | 157.39 lbf | 128.49 lbf |
| TMP | 253.77% | 1.69% | 482% | 18.39% | 11.42% | 35.98% | 29.37% |

Where required by the calculations, lbf is converted to lb mass force (slug) using the gravitational constant, g = 386 in sec$^{-2}$, e.g. $M_S/g$ = 10,000 lb / 386 in sec$^{-2}$ = 25.9 slug.

What is claimed is:

1. A vibrating equipment assembly for the movement of material resident therein comprising
   a vibratory bed for holding said material,
   a vibratory system connected to said bed for imparting a force to said bed at a predetermined angle of attack and operating frequency,
   a set of isolating springs coupled to said vibratory bed,
   a support structure for supporting said assembly, and
   a dynamic absorber associated with each of said isolating springs, said dynamic absorber including the following components:
   (a) an attaching member connected to one end of said associated isolating spring,
   (b) a modulating spring defining an essentially vertically oriented axis and being connected at one end to said attaching member and at another end to an underlying support structure,
   (c) an absorber spring connected at one to said attaching member and defining an axis oriented at angle to said modulating spring axis, and
   (d) an absorber mass connected at a distal end of said absorber spring,
   whereupon said components are selected to have the physical characteristics to provide said dynamic absorber with a frequency essentially the same as and operating essentially 180° out of phase with said predetermined operating frequency of said vibratory bed thereby minimizing the transfer of said force to said support structure.

2. The vibratory assembly of claim 1 in which said modulating spring is secured at one end to said attachment member and at the other end to the support structure.

3. The vibratory assembly of claim 2 in which said modulating spring has an annular cross-section and circumscribes said point of attachment of said one isolating spring.

4. The vibratory assembly of claim 3 wherein said attachment member is a plate and said one isolating spring is attached to a top surface thereof and said absorber spring and isolating springs are attached to an under surface of said plate.

5. The vibratory assembly of claim 1 wherein said vibratory device has an operating frequency range between a first predetermined frequency and a second predetermined frequency and said absorbing spring, absorbing mass, and said modulating spring collectively provide a dynamic transmission of less that about 100% at all operating frequencies of said operating frequency range.

6. A dynamic absorber system for use with vibrating equipment separated from an isolating spring and inducting vibrations to said supporting frame when the equipment is being operated, said system comprising:
   a) an attaching member adapted to be secured to one end of the isolating spring,
   (b) a modulating spring secured at one end to said attaching member and defining an axis oriented essentially vertical;
   (c) an absorber spring attached at one end to said attaching member and defining an axis oriented at an angle to said axis of said modulating spring, said absorber spring having a free distal other end; and
   (d) an absorber mass secured to the other end of said absorber spring whereupon said modulating spring, said absorber spring, and said absorber mass are selected to have physical characteristics sufficient to provide said dynamic absorber with a frequency matching an operating frequency of the vibrating equipment and 180° out of phase.

7. The absorber of claim 6 wherein the modulating spring is selected from the group consisting of rubber springs, steel coil springs, leaf springs, and fiberglass springs.

8. The absorber of claim 7 in which said modulating spring is an elastomeric spring with an annular section, said absorbing spring being attached to said attachment plate within an area encircled by said modulating spring.

9. The dynamic absorber of claim 7 wherein the absorber spring is selected from the group consisting of rubber springs, steel coil springs, leaf springs, and fiberglass springs.

10. The dynamic absorber of claim 7 in which said absorber spring is an elastomeric spring with an annular section and said absorber spring is attached to said attachment spring in an area enclosed by said rubber elastomeric spring.

11. The dynamic absorber of claim 7 in which said absorber spring projects downwardly at an angle to as to lie in a vertical plane substantially perpendicular to a longitudinal axis of said vibrating device.

* * * * *